US012597171B2

(12) United States Patent (10) Patent No.: US 12,597,171 B2
Corral-Soto et al. (45) Date of Patent: Apr. 7, 2026

(54) SYSTEMS AND METHODS FOR 3D POINT CLOUD DENSIFICATION

(71) Applicants: Eduardo Corral-Soto, Toronto (CA);
Bingbing Liu, Beijing (CN)

(72) Inventors: Eduardo Corral-Soto, Toronto (CA);
Bingbing Liu, Beijing (CN)

(73) Assignee: **HUAWEI TECHNOLOGIES CO.,
LTD.**, Shenzhen (CN)

( * ) Notice: Subject to any disclaimer, the term of this
patent is extended or adjusted under 35
U.S.C. 154(b) by 834 days.

(21) Appl. No.: 17/973,967

(22) Filed: Oct. 26, 2022

(65) Prior Publication Data

US 2023/0281877 A1 Sep. 7, 2023

Related U.S. Application Data

(60) Provisional application No. 63/316,624, filed on Mar.
4, 2022.

(51) Int. Cl.
*G06T 9/00* (2006.01)
(52) U.S. Cl.
CPC .............. *G06T 9/001* (2013.01); *G06T 9/002*
(2013.01)
(58) Field of Classification Search
CPC ..... G06T 9/001; G06T 9/002; G06T 2210/56;
G06T 2219/2024; G06T 19/20; G01S
7/4808; G01S 17/89; G06N 3/0455;
G06N 3/0464; G06N 3/09
See application file for complete search history.

(56) References Cited

U.S. PATENT DOCUMENTS

| | | | | |
|---|---|---|---|---|
| 11,816,267 | B2 * | 11/2023 | Kappus | G06F 3/016 |
| 11,902,705 | B2 * | 2/2024 | Shih | G06N 3/09 |
| 2020/0321118 | A1 * | 10/2020 | Kim | G06N 3/09 |

(Continued)

FOREIGN PATENT DOCUMENTS

| | | | | |
|---|---|---|---|---|
| CN | 118799337 A | * | 10/2024 | G06T 3/60 |
| CN | 120579438 A | * | 9/2025 | |

(Continued)

OTHER PUBLICATIONS

M. Wang, X. Qiu, S. Gao and Z. Zhang, "LiDAR-to-SAR Point
Cloud Segmentation via Unsupervised Domain Adaptation Net-
work," IGARSS 2024—2024 IEEE International Geoscience and
Remote Sensing Symposium, Athens, Greece, 2024, pp. 10808-
10812, (Year: 2024).*

(Continued)

*Primary Examiner* — Charles T Shedrick

(57) ABSTRACT

Devices, systems, methods, and media are disclosed for
domain adaptation using data densification. Example
embodiments described herein receives LiDAR 3D point
clouds from a source-domain and introduces interpolated 3D
points inferred by a trained deep learning neural network to
output a denser version of the input 3D point cloud with
increased resolution. The trained domain adaptation network
reconstructs the source-domain 3D point cloud data, gener-
ates translation vectors to compute interpolated 3D point
cloud data and merges the reconstructed 3D point cloud data
and the interpolated 3D point cloud data to output a densified
3D point cloud resembling data 3D point clouds captured
generated by the target LiDAR sensor from the source-
domain.

20 Claims, 12 Drawing Sheets

(56) References Cited

U.S. PATENT DOCUMENTS

2021/0166446 A1* 6/2021 Chen ........................ G06N 3/08
2022/0270259 A1* 8/2022 Yan ......................... G06V 10/24

FOREIGN PATENT DOCUMENTS

KR            102039138 B1 * 10/2019 ............. G06N 3/082
WO     WO-2007093711 A2 * 8/2007 ............. H04N 13/20

OTHER PUBLICATIONS

Ganin, Yaroslav, and Victor Lempitsky. "Unsupervised domain adaptation by backpropagation." International conference on machine learning. PMLR, 2015. (Year: 2015).*

Ku, Jason and Harakeh, Ali and Waslander, Steven L, "In defense of classical image processing: Fast depth completion on the cpu", CRV 2018.

Shan et al., "Simulation-based lidar super-resolution for ground vehicles", Robotics and Autonomous Systems 2020.

Corral-Soto et al., "HYLDA: End-to-end Hybrid Learning Domain Adaptation for LiDAR Semantic Segmentation", arXiv:2201.05585, 2022.

Li et at., "Dense surface reconstruction from monocular vision and LiDAR", ICRA 2019.

Corral-Soto, Eduardo R and Bingbing, Liu, "Understanding strengths and weaknesses of complementary sensor modalities in early fusion for object detection", IV 2020.

Corral-Soto et al., "LiDAR few-shot domain adaptation via integrated CycleGAN and 3D object detector with joint learning delay", ICRA 2021.

Wiesmann et al., "Deep compression for dense point cloud maps", ICRA 2021.

Thomas et al., "Kpconv: Flexible and deformable convolution for point clouds", ICCV 2019.

Corral-Soto, Eduardo R and Elder, James H, "Automatic single-view calibration and rectification from parallel planar curves", ECCV 2014.

https://once-for-auto-driving.github.io/.

* cited by examiner

600 —

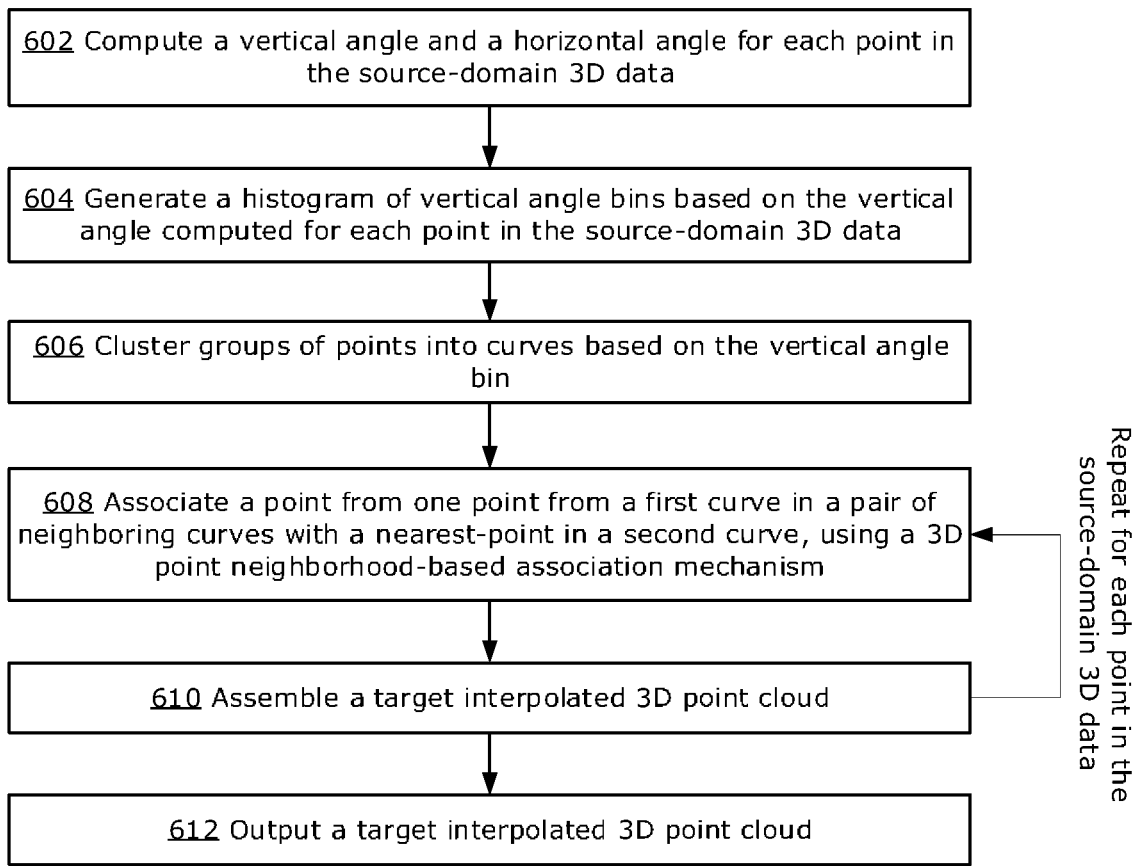

602 Compute a vertical angle and a horizontal angle for each point in the source-domain 3D data 604 Generate a histogram of vertical angle bins based on the vertical angle computed for each point in the source-domain 3D data 606 Cluster groups of points into curves based on the vertical angle bin 608 Associate a point from one point from a first curve in a pair of neighboring curves with a nearest-point in a second curve, using a 3D point neighborhood-based association mechanism 610 Assemble a target interpolated 3D point cloud 612 Output a target interpolated 3D point cloud Repeat for each point in the source-domain 3D data

FIG. 6

700 —

For each pair of neighboring curves Ci and Cj:

For each point (for example p1) in Ci:

1) Associate: find "nearest" point from Cj (for example p2)

* X, Y, Z distances (not isotropic), horz/vert angles

2) Interpolate:

v21 = p1 − p2 if |p1| <= |p2|:

v2_u = - p2/|p2| else:

v2_u = p2/|p2| v21_norm_XY = | v21[0:2] | v2_u_norm_XY = | v2_u[0:2] | v_p2_XY = v21_norm_XY * v2_u[0:2]/v2_u_norm_XY v_final = 0 * v21 v_final[0] = v_p2_XY[0]

v_final[1] = v_p2_XY[1]

v_final[2] = v21[2]

update = SCALE * v_final p_interp = p2 + update

FIG. 7

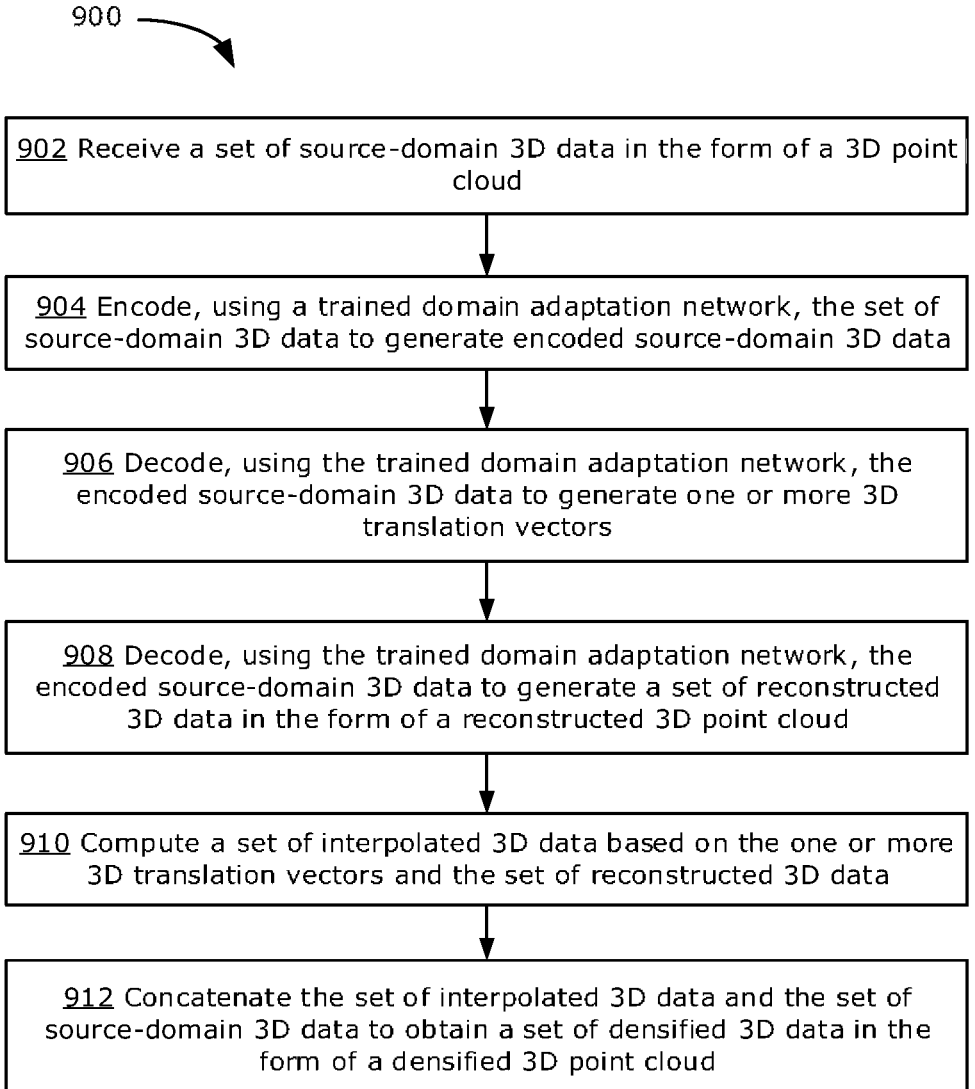

900

902 Receive a set of source-domain 3D data in the form of a 3D point cloud

904 Encode, using a trained domain adaptation network, the set of source-domain 3D data to generate encoded source-domain 3D data 906 Decode, using the trained domain adaptation network, the encoded source-domain 3D data to generate one or more 3D translation vectors 908 Decode, using the trained domain adaptation network, the encoded source-domain 3D data to generate a set of reconstructed 3D data in the form of a reconstructed 3D point cloud 910 Compute a set of interpolated 3D data based on the one or more 3D translation vectors and the set of reconstructed 3D data 912 Concatenate the set of interpolated 3D data and the set of source-domain 3D data to obtain a set of densified 3D data in the form of a densified 3D point cloud

FIG. 9

SYSTEMS AND METHODS FOR 3D POINT CLOUD DENSIFICATION

CROSS-REFERENCE TO RELATED APPLICATIONS

This application claims priority to and benefit of U.S. Provisional Patent Application No. 63/316,624 filed Mar. 4, 2022, the contents of which are incorporated by reference.

FIELD

The present application generally relates to domain adaptation, and in particular to devices, systems, methods, and media for domain adaptation of a trained machine learning model performing point cloud densification in 3D input space.

BACKGROUND

Computer vision is an integral part of various intelligent/autonomous systems in various fields, such as autonomous driving, autonomous manufacturing, inspection, and medical diagnosis. Computer vision is a field of artificial intelligence in which computers learn to interpret and understand the visual world using digital images. Using digital images generated by cameras, a computer can use a deep learning model to accurately "perceive" an environment (i.e. identify and classify objects) in the environment and react to what is "perceived" in the environment. For example, an autonomous vehicle has cameras mounted on the vehicle that capture images of the environment surrounding the vehicle during operation of the vehicle. A computer of the vehicle processes the digital images captured by the cameras.

In addition to cameras, or as an alternative to cameras, autonomous vehicles may use one or more LiDAR sensors to perceive their environments. A LIDAR (also referred to a "Lidar" or "LIDAR" herein) sensor generates point cloud data representing a three-dimensional (3D) environment scanned by the LiDAR sensor. A single scanning pass of the LiDAR sensor generates a "frame" of point cloud data, consisting of a set of points from which light is reflected from one or more points in space, within a time period representing the time it takes the LiDAR sensor to perform one scanning pass.

Depending on the type of LiDAR sensor, the vertical resolution (for example, the number of channels) of the captured data may differ. Training a network to perform 3D object detection with labeled frames captured in a first domain, won't generalize well when the 3D object detection network is evaluated using 3D point clouds (i.e. frames) captured in a second domain due to the domain shift introduced by the different number of channels of the sensors used. As such, LIDAR datasets captured by different sensors may be considered to be unpaired datasets.

Accordingly, it would be useful to provide a method and system for domain adaptation to better match the resolution of unpaired datasets used for training neural networks.

SUMMARY

The present disclosure describes devices, systems, methods, and media for domain adaptation using data densification. Example embodiments described herein may use a densification approach to domain adaptation that upsamples a sparsely labeled source-domain dataset, to more closely resemble the resolution of a target-domain dataset. Networks performing prediction tasks, such as 3D object detection or semantic segmentation that are trained using target-domain data and densified source-domain data may then generalize well when evaluated with a target-domain validation data.

In various examples, the present disclosure provides the technical effect that by performing domain adaptation on unpaired datasets to better match the resolution of unpaired datasets, neural networks (for example, neural networks for performing 3D object detection) can be trained more effectively.

A technical advantage of examples of the disclosed method and system is that the enclosed method and system help to improve the training of 3D object detection models that generalize well, irrespective of the domain the dataset was captured in.

In some example aspects, the present disclosure describes a method for obtaining a densified 3D point cloud. The method includes: receiving a source-domain 3D point cloud comprising a set of source-domain 3D data; encoding, using a trained domain adaptation network, the set of source-domain 3D data to generate encoded source-domain 3D data; decoding, using the trained domain adaptation network, the encoded source-domain 3D data to generate one or more 3D translation vectors; decoding, using the trained domain adaptation network, the encoded source-domain 3D data to generate a reconstructed 3D point cloud comprising a set of reconstructed 3D data; computing a set of interpolated 3D data based on the one or more 3D translation vectors and the set of reconstructed 3D data; and concatenating the set of interpolated 3D data and the set of source-domain 3D data to obtain a densified 3D point cloud comprising a set of densified 3D data.

In the previous example aspect of the method, the method may further include, wherein encoding the set of source-domain 3D data to generate encoded source-domain 3D data comprises performing kernel point convolution on each point in the set of source-domain 3D data to generate one or more feature arrays.

In the previous example aspect of the method, the method may further include, wherein decoding the encoded source-domain 3D data to generate one or more 3D translation vectors comprises performing a regression on the encoded source-domain 3D data to generate a 3D translation vector corresponding to each point in the set of reconstructed 3D data.

In the previous example aspect of the method, the method may further include, wherein computing the set of interpolated 3D data comprises adding a corresponding translation vector to each corresponding data point in the set of reconstructed 3D data to obtain a locally-translated version of the reconstructed 3D data points.

In some example aspects of the method, the method may further include training the domain adaptation network by: obtaining a first training data, based on the set of source-domain 3D data; computing a second training data comprising a set of target interpolated 3D data, based on the set of source-domain 3D data; and training the domain adaptation network based on the first training data and the second training data, where training of the domain adaptation network includes computing an overall loss function.

In the previous example aspect of the method, the method may further include, wherein computing the second training data comprises, for each point in the set of source-domain 3D data: computing a vertical angle and a horizontal angle; generating a histogram of vertical angle bins based on the vertical angle computed for each point in the set of source-domain 3D data; clustering groups of points of the set of source-domain 3D data into curves based on the histogram of vertical angle bins; associating a first point corresponding to a first group of clustered points with a nearest-point from a second group of clustered points, using a 3D point neighborhood-based association mechanism; generating a unit vector corresponding to the first point corresponding to a first group of clustered points based on the nearest-point from the second group of clustered points; projecting an intermediate point information based on unit vector corresponding to the first point corresponding to the first group of clustered points; and scaling the intermediate point information based on a scaling factor to define an interpolated point.

In the previous example aspect of the method, the projected intermediate point information is a location and the scaled intermediate point location defines an interpolated position of the point.

In some example aspects of the method, the scaling factor is selectable and different interpolated points are definable for the first point by scaling the intermediate point information based on different selections of the scaling factor.

In some example aspects of the method, the method may further include, wherein computing the overall loss function comprises calculating at least one of: a reconstruction loss; an interpolation loss; or a regularization loss.

In the previous example aspect of the method, the method may further include, wherein calculating the regularization loss comprises calculating one or more vertical angles for each point in the reconstructed 3D data; calculating one or more vertical angles for each point in the target interpolated 3D data; computing one or more sine loss functions based on the one or more vertical angles for each point in the reconstructed 3D data and the one or more vertical angles for each point in the target interpolated 3D data; and comparing the one or more vertical angles for each point in the reconstructed 3D data and the one or more vertical angles for each point in the target interpolated 3D data to a corresponding sine function of the one or more sine loss functions and minimizing the one or more vertical angles with respect to a valley of the corresponding sine function In some example aspects of the method, wherein the set of source-domain 3D data is received from a LIDAR sensor, the LiDAR sensor being a rotating LIDAR sensor.

In some example aspects, the present disclosure describes a system. The system comprises one or more processors and one or more memories storing machine-executable instructions which, when executed by the processor, cause the system to receive a source-domain 3D point cloud comprising a set of source-domain 3D data; encode, using a trained domain adaptation network, the set of source-domain 3D data to generate encoded source-domain 3D data; decode, using the trained domain adaptation network, the encoded source-domain 3D data to generate one or more 3D translation vectors; decode, using the trained domain adaptation network, the encoded source-domain 3D data to generate a reconstructed 3D point cloud comprising a set of reconstructed 3D data; compute a set of interpolated 3D data based on the one or more 3D translation vectors and the set of reconstructed 3D data; and concatenate the set of interpolated 3D data and the set of source-domain 3D data to obtain a densified 3D point cloud comprising a set of densified 3D data.

In the previous example aspect of the system, wherein the machine-executable instructions, when executed by the processor device to encode the set of source-domain 3D data to generate encoded source-domain 3D data, further cause the system to: perform kernel point convolution on each point in the set of source-domain 3D data to generate one or more feature arrays.

In the previous example aspect of the system, wherein the machine-executable instructions, when executed by the processor device to decode the set of source-domain 3D data to generate one or more 3D translation vectors, further cause the system to: perform a regression on the encoded source-domain 3D data to generate a 3D translation vector corresponding to each point in the set of reconstructed 3D data.

In the previous example aspect of the system, wherein the machine-executable instructions, when executed by the processor device to compute the set of interpolated 3D data, further cause the system to: add a corresponding translation vector to each corresponding data point in the set of reconstructed 3D data to obtain a locally-translated version of the reconstructed 3D data points.

In some example aspects of the system, wherein the machine-executable instructions, when executed by the processor device, further cause the system to: train the domain adaptation network by: obtaining a first training data, based on the set of source-domain 3D data; computing a second training data comprising a set of target interpolated 3D data, based on the set of source-domain 3D data; and training the domain adaptation network based on the first training data and the second training data, where training of the domain adaptation network includes computing an overall loss function.

In the previous example aspect of the system, wherein the machine-executable instructions, when executed by the processor device to compute a second training data, further cause the system to: for each point in the set of source-domain 3D data: compute a vertical angle and a horizontal angle; generate a histogram of vertical angle bins based on the vertical angle computed for each point in the set of source-domain 3D data; cluster groups of points of the set of source-domain 3D data into curves based on the histogram of vertical angle bins; associate a first point corresponding to a first group of clustered points with a nearest-point from a second group of clustered points, using a 3D point neighborhood-based association mechanism; generate a unit vector corresponding to the first point corresponding to a first group of clustered points based on the nearest-point from the second group of clustered points; project an intermediate point information based on unit vector corresponding to the first point corresponding to the first group of clustered points; and scale the intermediate point information based on a scaling factor to define an interpolated point.

In the previous example aspect of the system, wherein the projected intermediate point information is a location and the scaled intermediate point location defines an interpolated position of the point.

In the previous example aspect of the system, wherein the machine-executable instructions, when executed by the processor device to compute an overall loss function, further cause the system to: calculate a regularization loss by: calculating one or more vertical angles for each point in the reconstructed 3D data; calculating one or more vertical angles for each point in the target interpolated 3D data; computing one or more sine loss functions based on the one or more vertical angles for each point in the reconstructed 3D data and the one or more vertical angles for each point in the target interpolated 3D data; and comparing the one or more vertical angles for each point in the reconstructed 3D data and the one or more vertical angles for each point in the target interpolated 3D data to a corresponding sine function of the one or more sine loss functions and minimizing the one or more vertical angles with respect to a valley of the corresponding sine function.

In some aspects, the present disclosure describes a non-transitory computer-readable medium having machine-executable instructions stored thereon which, when executed by one or more processors of a computing system, cause the computing system to: receive a source-domain 3D point cloud comprising a set of source-domain 3D data; encode, using a trained domain adaptation network, the set of source-domain 3D data to generate encoded source-domain 3D data; decode, using the trained domain adaptation network, the encoded source-domain 3D data to generate one or more 3D translation vectors; decode, using the trained domain adaptation network, the encoded source-domain 3D data to generate a reconstructed 3D point cloud comprising a set of reconstructed 3D data; compute a set of interpolated 3D data based on the one or more 3D translation vectors and the set of reconstructed 3D data; and concatenate the set of interpolated 3D data and the set of source-domain 3D data to obtain a densified 3D point cloud comprising a set of densified 3D data

BRIEF DESCRIPTION OF THE DRAWINGS

Reference will now be made, by way of example, to the accompanying drawings which show example embodiments of the present application, and in which:

FIG. 6 is a flowchart illustrating steps of an example method for generating a target interpolated 3D point cloud, in accordance with examples described herein.

FIG. 7 illustrates an example pseudocode, which may be used to interpolate 3D data points, in accordance with examples described herein.

FIG. 9 is a flowchart illustrating steps of an example method for domain adaptation using point cloud densification, in accordance with examples described herein.

Similar reference numerals may have been used in different figures to denote similar components.

DETAILED DESCRIPTION

Figure 1:
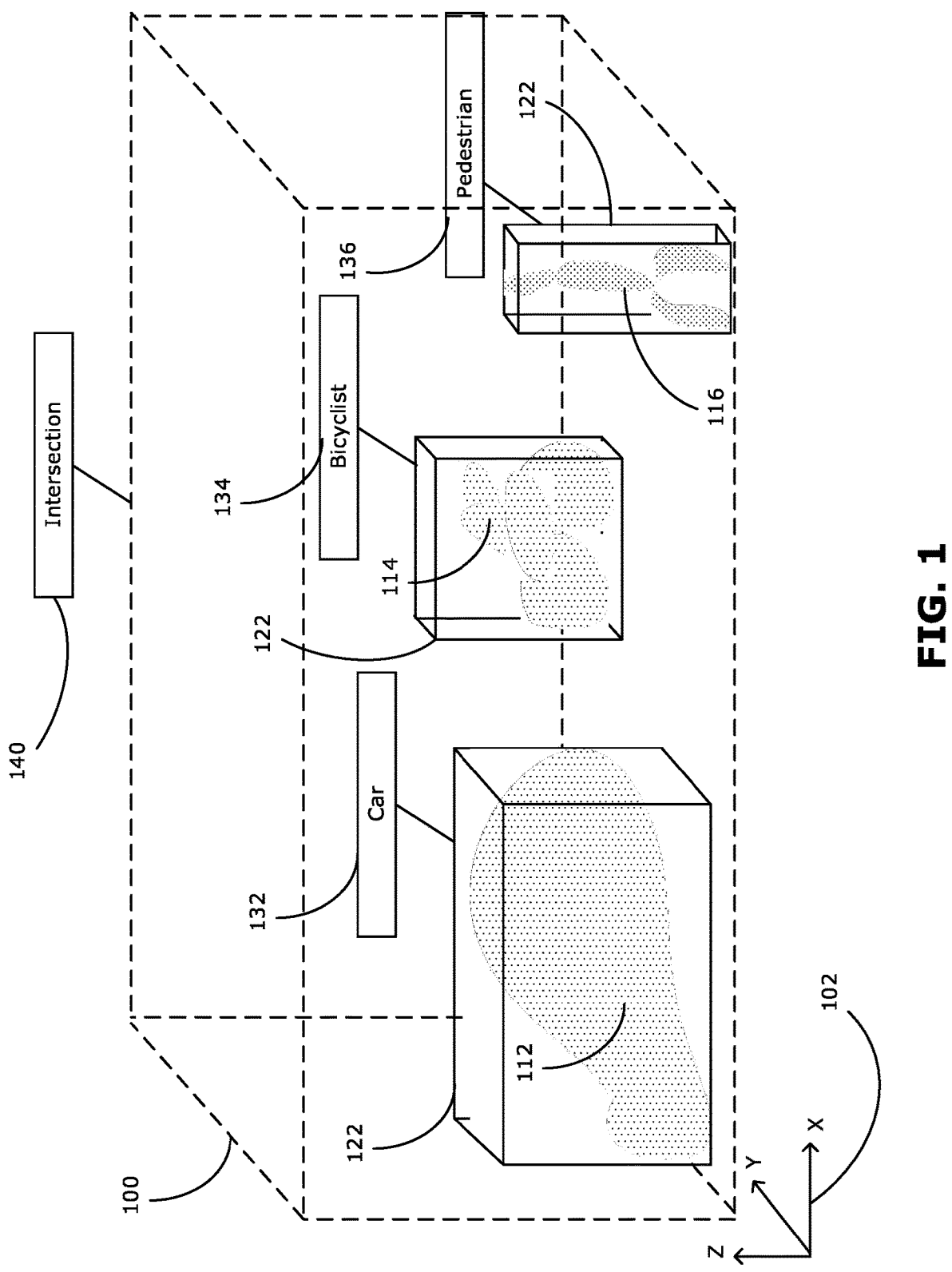
FIG. 1 is an upper front right side perspective view of an example simplified point cloud frame, providing an operating context for embodiments described herein.

As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item.

Example embodiments will be described with reference to training a model to perform a domain adaptation task on point cloud data obtained from LIDAR sensors, for the purpose of performing a prediction task, for example 3D object detection or semantic segmentation. However, it will be appreciated that the systems, devices, methods, and computer-readable media described herein are equally applicable to training a model to perform a different prediction task, and/or to perform the prediction task on different types of data.

To assist in understanding the present disclosure, the following describes some concepts relevant to domain adaptation, along with some relevant terminology that may be related to examples disclosed herein.

A LIDAR sensor generates point cloud data representing a three-dimensional (3D) environment scanned by the LiDAR sensor. Some LiDAR sensors, such as spinning scanning LiDAR sensors, include a laser array that emits light in an arc and the LiDAR sensor rotates around a single location to generate a point cloud frame; other LiDAR sensors, such as solid-state LiDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). In a scanning spinning LIDAR sensor, the Z axis of the point cloud frame is typically defined by the axis of rotation of the LiDAR sensor, roughly orthogonal to an azimuth direction of each laser in most cases (although some LiDAR sensors may angle some of the lasers slightly up or down relative to the plane orthogonal to the axis of rotation).

In addition to cameras, or as an alternative to cameras, autonomous vehicles may use one or more LiDAR sensors to perceive their environments. A LIDAR (also referred to a "Lidar" or "LiDAR" herein) sensor generates point cloud data representing a three-dimensional (3D) environment (also called a "scene") scanned by the LiDAR sensor. A single scanning pass of the LiDAR sensor generates a "frame" of point cloud data (referred to hereinafter as a "point cloud frame" or simply a "frame"), consisting of a set of points from which light is reflected from one or more points in space, within a time period representing the time it takes the LIDAR sensor to perform one scanning pass. Some LiDAR sensors, such as spinning scanning LiDAR sensors, includes a laser array that emits light in an arc and the LIDAR sensor rotates around a single location to generate a point cloud frame; others LiDAR sensors, such as solid-state LiDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a scanning spinning LiDAR sensor, the Z axis of the point cloud frame is typically defined by the axis of rotation of the LIDAR sensor, roughly orthogonal to an azimuth direction of each laser in most cases (although some LiDAR sensor may angle some of the lasers slightly up or down relative to the plane orthogonal to the axis of rotation).

Point cloud frames may also be generated by other scanning technologies, such as high-definition radar or depth cameras, and theoretically any technology using scanning beams of energy, such as electromagnetic or sonic energy, could be used to generate point cloud frames. Whereas examples will be described herein with reference to LiDAR sensors, it will be appreciated that other sensor technologies which generate point cloud frames could be used in some embodiments.

Because of the sparse and unordered nature of point cloud frames, the cost of collecting and labeling point cloud frames at the point level (i.e. labelling the points in point cloud frames) is time consuming and expensive, typically involving human-generated labels added to subsets of points within the point cloud frame. Points in a point cloud frame must be clustered, segmented, or grouped (e.g., using object detection, semantic segmentation, instance segmentation, or panoptic segmentation) such that a collection of points in the point cloud frame may be labeled with an object class (e.g., "pedestrian" or "motorcycle") or an instance of an object class (e.g. "pedestrian #3") by a human, with these labels being used in machine learning to train models for prediction tasks on point cloud frames, such as object detection or various types of segmentation. Only after the model has been trained can the trained model be used to automatically label points within previously-unlabeled point cloud frames. This cumbersome process of labeling has resulted in limited availability of labeled point cloud frames representing various road and traffic scenes, which are needed to train high accuracy models for prediction tasks on point cloud frames using machine learning.

Examples of such labeled point cloud datasets that include point cloud frames that are used to train models using machine learning for prediction tasks, such as segmentation and objection detection, are the SemanticKITTI dataset (described by J. Behley et al., "SemanticKITTI: A Dataset for Semantic Scene Understanding of LiDAR Sequences," 2019 IEEE/CVF International Conference on Computer Vision (ICCV), Seoul, Korea (South), 2019, pp. 9296-9306, doi: 10.1109/ICCV.2019.00939), KITTI360 (described by J. Xie, M. Kiefel, M. Sun and A. Geiger, "Semantic Instance Annotation of Street Scenes by 3D to 2D Label Transfer," 2016 IEEE Conference on Computer Vision and Pattern Recognition (CVPR), Las Vegas, NV, USA, 2016, pp. 3688-3697, doi: 10.1109/CVPR.2016.401.), and Nuscenes-lidarseg (described by H. Caesar et al., "nuScenes: A Multimodal Dataset for Autonomous Driving," 2020 IEEE/CVF Conference on Computer Vision and Pattern Recognition (CVPR), Seattle, WA, USA, 2020, pp. 11618-11628, doi: 10.1109/CVPR42600.2020.01164.). SemanticKITTI and nuScenes may be the only available point cloud datasets with semantic information, i.e. point cloud frames labeled with semantic information for training models for prediction tasks on point cloud frames, such as segmentation or object detection.

The problem addressed by domain adaptation may be formulated as follows: given two unpaired datasets from two domains, X and Y, and given sufficient information (such as semantic labels) to perform a prediction task (such as semantic segmentation or instance segmentation) on the dataset from domain Y, domain adaptation seeks to train a neural network or other model, using machine learning, to perform the prediction task on the dataset from domain X. In the context of point clouds, the two unpaired datasets may include data samples (i.e. point cloud frames) captured using two different LiDAR sensors with different specifications (e.g., different resolutions) in two different locations (e.g., two different countries), where the objects of interest in the data samples (i.e. point clouds) of the two unpaired datasets may vary in type, shape, or size. The datasets may differ based on intrinsic parameters of the LiDAR sensor (e.g., number of channels, resolution, and field of view), extrinsic parameters of the LiDAR sensor (e.g., location of the sensor, position of the sensor), differences in scenes or objects (e.g. differences in types or shapes of objects encountered in different countries), and the size of the labeled dataset. In this description of domain adaptation, domain Y may be referred to as the "source-domain", and domain X may be referred to as the "target-domain".

As used herein, the term "imaging data" refers to data, such as point cloud frames, which represent a scene seen from the point of view of an imaging sensor, such as a LIDAR sensor.

As used herein, the term "model" refers to a probabilistic, mathematical, or computational model used to process input data to generate prediction information regarding the input data. In the context of machine learning, a "model" refers to a model trained using machine learning techniques; the term "network" may refer to a model trained using machine learning that is configured as an artificial neural network or other network structure. The term "subnetwork" refers to a portion of network or other model.

As used herein, the term "data sample" refers to a single instance of data in a particular format. A single data sample may be provided to a model as input data; in some embodiments, a batch including multiple data samples may be provided as input to the model. In some examples, a model may a generate a data sample as output data. Examples of a single data sample include a camera image (in various formats) or a point cloud (in various formats).

As used herein, the term "domain" refers to a context in which a dataset is generated. In the context of point clouds, such as point clouds generated by LiDAR sensors, the domains of two point cloud frames may differ due to factors such as intrinsic parameters of the LiDAR sensor which generated the two point cloud frames (e.g., number of channels, resolution, and field of view), extrinsic parameters of the LiDAR sensor which generated the two point cloud frames (e.g., location of the sensor, position of the sensor), differences in scenes or objects (e.g. differences in types or shapes of objects encountered in different countries), and the sizes of the datasets.

To assist in understanding the present disclosure, some existing technologies are first discussed.

Existing depth completion methods include the method described in Ku, Jason, Ali Harakeh, and Steven L. Waslander. "In defense of classical image processing: Fast depth completion on the cpu," 2018 15th Conference on Computer and Robot Vision (CRV), IEEE, 2018, the entirety of which is hereby incorporated by reference, super resolution methods such as described in Shan, Tixiao, et al. "Simulation-based lidar super-resolution for ground vehicles," Robotics and Autonomous Systems 134 (2020): 103647, the entirety of which is hereby incorporated by reference, and LiDAR domain adaptation methods such as described in Corral-Soto, Eduardo R., et al. "Domain Adaptation in LiDAR Semantic Segmentation via Alternating Skip Connections and Hybrid Learning" arXiv preprint arXiv: 2201.05585 (2022), the entirety of which is hereby incorporated by reference, all pre-process the LiDAR point cloud by projecting it onto a camera image plane or onto a spherical range image so deep neural networks originally designed for RGB camera images can be modified to train with these projected LIDAR images. Other methods fuse RGB image data with projected LiDAR image data to learn features jointly from the two domains, such as the methods described in Li, Zimo, Prakruti C. Gogia, and Michael Kaess, "Dense surface reconstruction from monocular vision and LiDAR," 2019 International Conference on Robotics and Automation (ICRA), IEEE, 2019, the entirety of which is hereby incorporated by reference, and the method described in Corral-Soto, Eduardo R and Bingbing, Liu, "Understanding strengths and weaknesses of complementary sensor modalities in early fusion for object detection", IV 2020, the entirety of which is hereby incorporated by reference. In contrast, unlike projection-based approaches, a LiDAR CycleGAN method described in Corral-Soto et al., "LIDAR few-shot domain adaptation via integrated CycleGAN and 3D object detector with joint learning delay", ICRA 2021, the entirety of which is hereby incorporated by reference, leverages voxel feature encoders to learn pseudo-images, which are learned 3D feature tensors that are used as the inputs to conventional convolutional layers to be able to train networks with LiDAR data.

Recently, a LiDAR point cloud compression approach called "Depoco" was described in: Wiesmann, Louis, et al. "Deep compression for dense point cloud maps," IEEE Robotics and Automation Letters 6.2 (2021): 2060-2067, the entirety of which is hereby incorporated by reference. The Depoco compression method receives a very dense LiDAR point cloud called a "map", which is a set of point clouds registered using vehicle odometry temporal information. The Depoco method uses the kernel point convolution (KPConv) algorithm described in Thomas, Hugues, et al. "Kpconv: Flexible and deformable convolution for point clouds," Proceedings of the IEEE/CVF international conference on computer vision, 2019, the entirety of which is hereby incorporated by reference, to perform convolutions directly on the 3D points as opposed to on an image tensor. Depoco uses KPConv and other standard deep learning layers, such as MLPs (Multi-layer Perceptron), RELU, batch normalization, and grid sampling to implement an encoder network that is used to compress the input map, into a compact feature representation called embedding, which can then be transmitted or stored as a compressed version of the map. For decompression, Depoco uses a decoder based on MLPs to receive the compact embedding tensor, and regresses 3D points that are re-introduced progressively at each decoding layer, to produce an output map of approximately the same size as the original input map.

The present disclosure describes examples that may help to address some or all of the above drawbacks of existing technologies.

The following describes example technical solutions of this disclosure with reference to accompanying figures. Similar reference numerals may have been used in different figures to denote similar components.

FIG. 1 shows an example simplified point cloud frame 100, with points mapped to a three-dimensional coordinate system 102 X, Y, and Z, wherein the Z dimension extends upward, typically as defined by the axis of rotation of the LiDAR sensor or other panoramic sensor generating the point cloud frame 100. The point cloud frame 100 includes a number of points, each of which may be represented by a set of coordinates (x, y, z) within the point cloud frame 100 along with a vector of other values, such as an intensity value indicating the reflectivity of the object corresponding to the point. Each point represents a reflection of light emitted by a laser at a point in space relative to the LiDAR sensor corresponding to the point coordinates. Whereas the example point cloud frame 100 is shown as a box-shape or rectangular prism, it will be appreciated that a typical point cloud frame captured by a panoramic LiDAR sensor is typically a 360 degree panoramic view of the environment surrounding the LiDAR sensor, extending out to a full detection range of the LiDAR sensor. The example point cloud frame 100 is thus more typical of a small portion of an actual LiDAR-generated point cloud frame, and is used for illustrative purposes.

The points of the point cloud frame 100 are clustered in space where light emitted by the lasers of the LiDAR sensor are reflected by objects in the environment, thereby resulting in clusters of points corresponding to the surface of the object visible to the LiDAR sensor. A first cluster of points 112 corresponds to reflections from a car. In the example point cloud frame 100, the first cluster of points 112 is enclosed by a bounding box 122 and associated with an object class label, in this case the label "car" 132. A second cluster of points 114 is enclosed by a bounding box 122 and associated with the object class label "bicyclist" 134, and a third cluster of points 116 is enclosed by a bounding box 122 and associated with the object class label "pedestrian" 136. Each point cluster 112, 114, 116 thus corresponds to an object instance: an instance of object class "car", "bicyclist", and "pedestrian" respectively. The entire point cloud frame 100 is associated with a scene type label 140 "intersection" indicating that the point cloud frame 100 as a whole corresponds to the environment near a road intersection (hence the presence of a car, a pedestrian, and a bicyclist in close proximity to each other).

In some examples, a single point cloud frame may include multiple scenes, each of which may be associated with a different scene type label 140. A single point cloud frame may therefore be segmented into multiple regions, each region being associated with its own scene type label 140. Example embodiments will be generally described herein with reference to a single point cloud frame being associated with only a single scene type; however, it will be appreciated that some embodiments may consider each region in a point cloud frame separately for point cloud object instance injection using the data augmentation methods and systems described herein.

Each bounding box 122 is sized and positioned, each object label 132, 134, 136 is associated with each point cluster, and the scene label is associated with the point cloud frame 100 using data labeling techniques known in the field of machine learning for generating labeled point cloud frames.

The labels and bounding boxes of the example point cloud frame 100 shown in FIG. 1 correspond to labels applied in the context of object detection, and the example point cloud frame could therefore be included in a training dataset that is used to train a machine learned model for object detection on point cloud frames. However, methods and systems described herein are equally applicable not only to models for object detection on point cloud frames, but also models for segmentation on point cloud frames, including semantic segmentation, instance segmentation, or panoptic segmentation on point cloud frames. For example, a point cloud frame labeled using semantic segmentation might include multiple "cars" such as 112, but each point in each such point cloud would be labeled with the same "car" label; the individual object instances corresponding to each car in the real-world scene would not be segmented or distinguished from each other by a semantic segmentation labeling process. By the same token, semantic segmentation would not define the labeled point clouds 112, 114, 116 using bounding boxes; rather, each point within each such point cloud would simply be associated with a semantic label indicating a category (e.g., "car", "bicyclist", "pedestrian").

Figure 2:
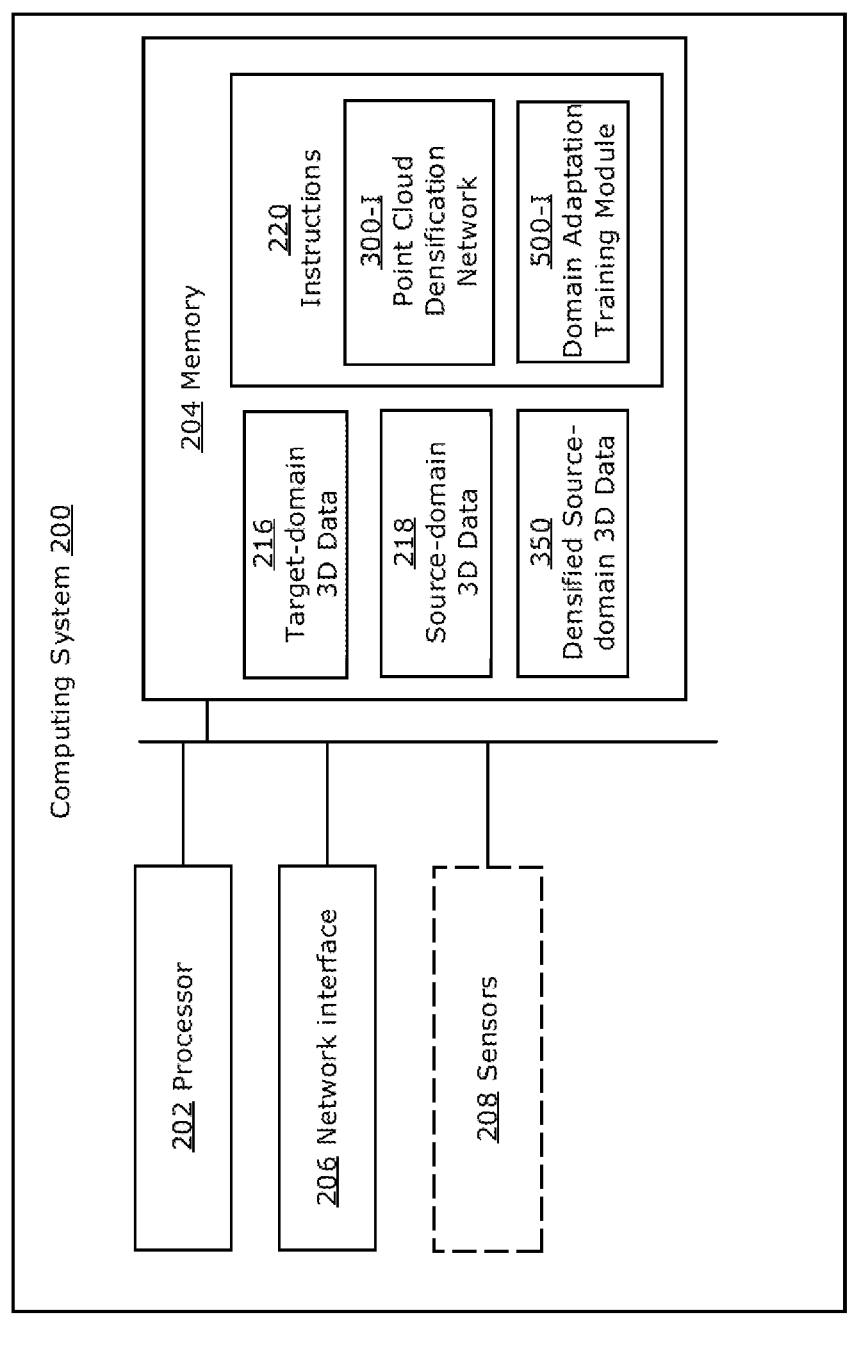
FIG. 2 is a block diagram of an example computing system suitable for implementation of examples described herein.

FIG. 2 is a block diagram of a computing system 200 (hereinafter referred to as system 200) for training a point cloud densification network to convert source-domain 3D data to a structure that better resembles a target domain. Although an example embodiment of the system 200 is shown and discussed below, other embodiments may be used to implement examples disclosed herein, which may include components different from those shown. Although FIG. 2 shows a single instance of each component of the system 200, there may be multiple instances of each component shown.

The system 200 includes one or more processors 202, such as a central processing unit, a microprocessor, an application-specific integrated circuit (ASIC), a field-programmable gate array (FPGA), a dedicated logic circuitry, a tensor processing unit, a neural processing unit, a tensor processing unit, dedicated artificial intelligence processing unit, an accelerator, or combinations thereof. The one or more processors 202 may collectively be referred to as a "processor device" or "processor 202".

The system 200 includes one or more memories 204 (collectively referred to as "memory 204"), which may include a volatile or non-volatile memory (e.g., a flash memory, a random access memory (RAM), and/or a read-only memory (ROM)). The non-transitory memory 204 may store machine-executable instructions for execution by the processor 202, such as to carry out examples described in the present disclosure. A set of machine-executable instructions 220 are shown stored in the memory 204, which may each be executed by the processor 202 to perform the steps of the methods described herein. The instructions may include instructions 300-I for implementing and operating the point cloud densification network 300 described below with reference to FIG. 3. The instructions may also include instructions 500-I for implementing and operating the domain adaptation training module 500 is described below with reference to FIG. 5A. The memory 204 may include other machine-executable instructions, such as for implementing an operating system and other applications or functions.

The memory 204 stores one or more datasets, such as a target-domain 3D data 216, a source-domain 3D data 218 and a densified source-domain 3D data 350. In example embodiments described herein, the densified source-domain dataset 350 is generated by the point cloud densification network 300 as described below with reference to FIGS. 3, 4A and 4B for the purpose of training a prediction task, for example, 3D object detection or semantic segmentation. The memory 204 may also store other data, information, rules, policies, and machine-executable instructions described herein.

The system 200 includes at least one network interface 206 for wired or wireless communication with other systems. For example, the system 200 may receive sensor data (e.g., low resolution LiDAR sensor data and/or high resolution LIDAR sensor data) via the network interface 206. Optionally, the system 200 may include one or more sensors 208 (e.g., the system 200 may include a low resolution LiDAR sensor, or may include a high resolution LiDAR sensor).

In some examples, the system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 204 to implement data storage, retrieval, and caching functions of the system 200.

The components of the system 200 may communicate with each other via a bus, for example. In some embodiments, the system 200 is a distributed computing system such as a cloud computing system and may include multiple computing devices in communication with each other over a network, as well as optionally one or more additional components. The various operations described herein may be performed by different devices of a distributed system in some embodiments.

Figure 3:
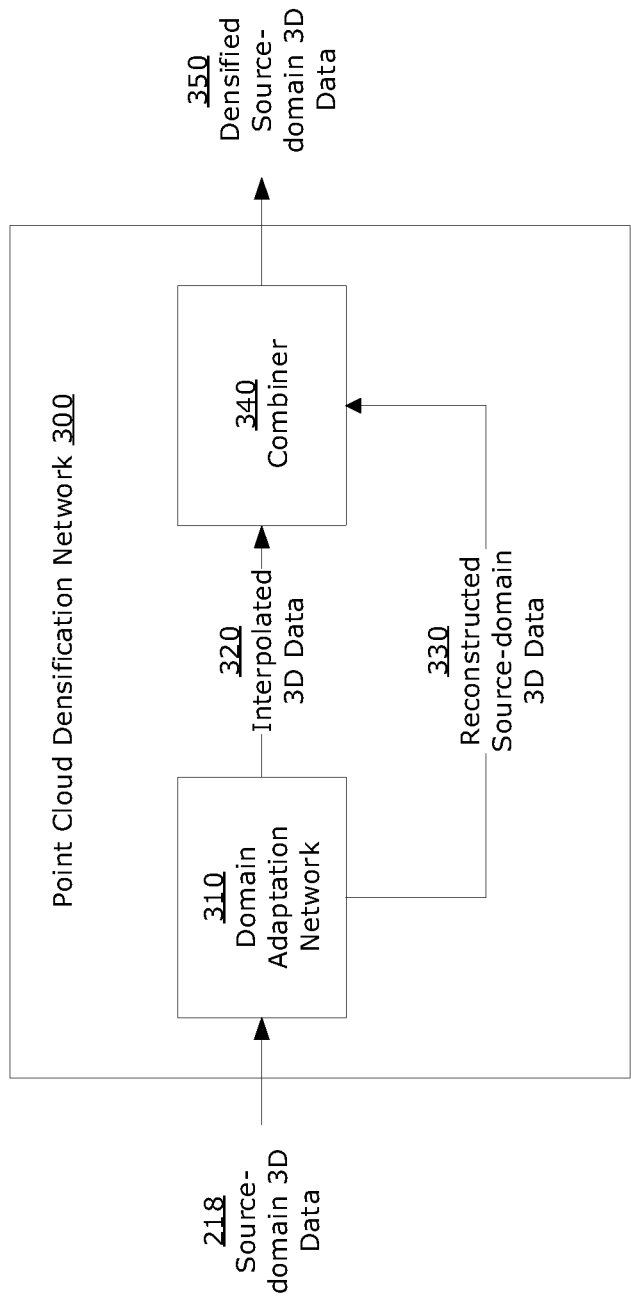
FIG. 3 is a block diagram of an example point cloud densification network, in accordance with examples described herein.

FIG. 3 is a block diagram of an example point cloud densification network 300 of the present disclosure. The point cloud densification network 300 can be a software that is implemented in the computing system 200 of FIG. 2, in which the processor 202 is configured to execute instructions 300-I of the point cloud densification network 300 stored in the memory 204. In some examples, the point cloud densification network 300 is a trained machine learning network. The point cloud densification network 300 includes a domain adaptation network 310 and a combiner 340. In some implementations, different functions of the point cloud densification network 300 can be performed on different devices other than the computing system 200. For example, computationally intensive functions can be performed on a cloud computing platform in communication with a local computing system 200.

In some examples, the point cloud densification network 300 receives as input a data sample of source-domain 3D data 218 and outputs a densified source-domain 3D data 350. The source-domain 3D data 218 may be a sparse 3D point cloud of N points generated by a low resolution LiDAR sensor of the computing system 200 and stored in memory 204 of the computing system for retrieval by the point cloud densification network 300.

In some examples, the source-domain 3D data 218 may be provided to a domain adaptation network 310 of the point cloud densification network 300 to generate an interpolated 3D data 320 and a reconstructed source-domain 3D data 330. The domain adaptation network 310 will now be described with reference to FIGS. 4A and 4B.

Figure 4A:
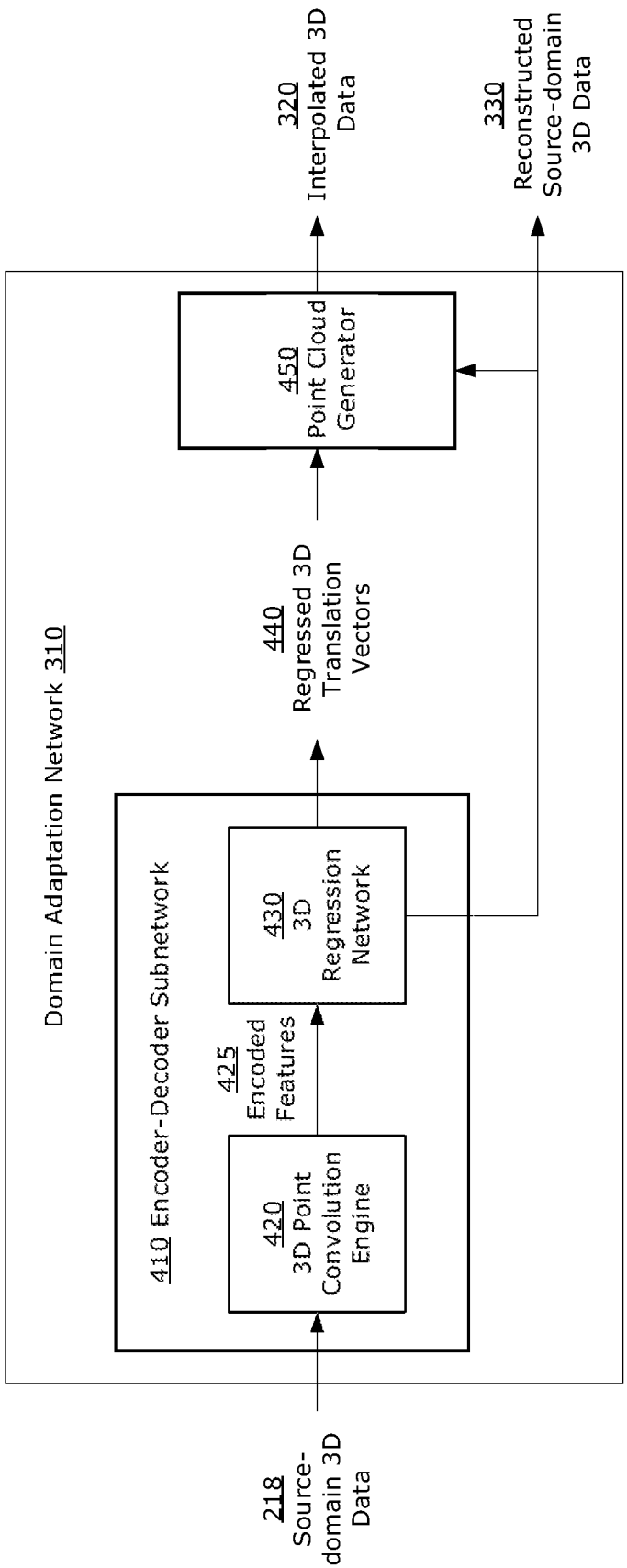
FIG. 4A is a block diagram of an example domain adaptation network, in accordance with examples described herein.

FIG. 4A is a block diagram of an example domain adaptation network 310 of the present disclosure. In some examples, the domain adaptation network 310 includes an encoder-decoder subnetwork 410 that receives the source-domain 3D data y 218 and outputs a set of N regressed 3D translation vectors δ 440 and the reconstructed source-domain 3D data ŷ 330. In examples, the reconstructed source-domain 3D data ŷ 330 may be a 3D point cloud of N points resembling the 3D point cloud of the source-domain 3D data y 218.

In some examples, the encoder-decoder subnetwork 410 includes a 3D point convolution engine 420 and a 3D regression network 430. In some examples, the 3D point convolution engine 420 is an encoder 420 and the 3D regression network 430 is a decoder 430. In some examples, the 3D point convolution engine 420 may be a kernel-point convolution (KPConv) engine that performs convolution directly on points within a point cloud and passes encoded features 425 to the 3D regression network 430. An example of a KPConv framework that can be implemented in example embodiments is described in: Thomas, Hugues, et al. "Kpconv: Flexible and deformable convolution for point clouds," Proceedings of the IEEE/CVF international conference on computer vision, 2019, the entirety of which is hereby incorporated by reference. Another example of a KPConv framework that can be implemented in example embodiments is described in: Wiesmann, Louis, et al. "Deep compression for dense point cloud maps," IEEE Robotics and Automation Letters 6.2 (2021): 2060-2067, the entirety of which is hereby incorporated by reference.

Figure 4B:
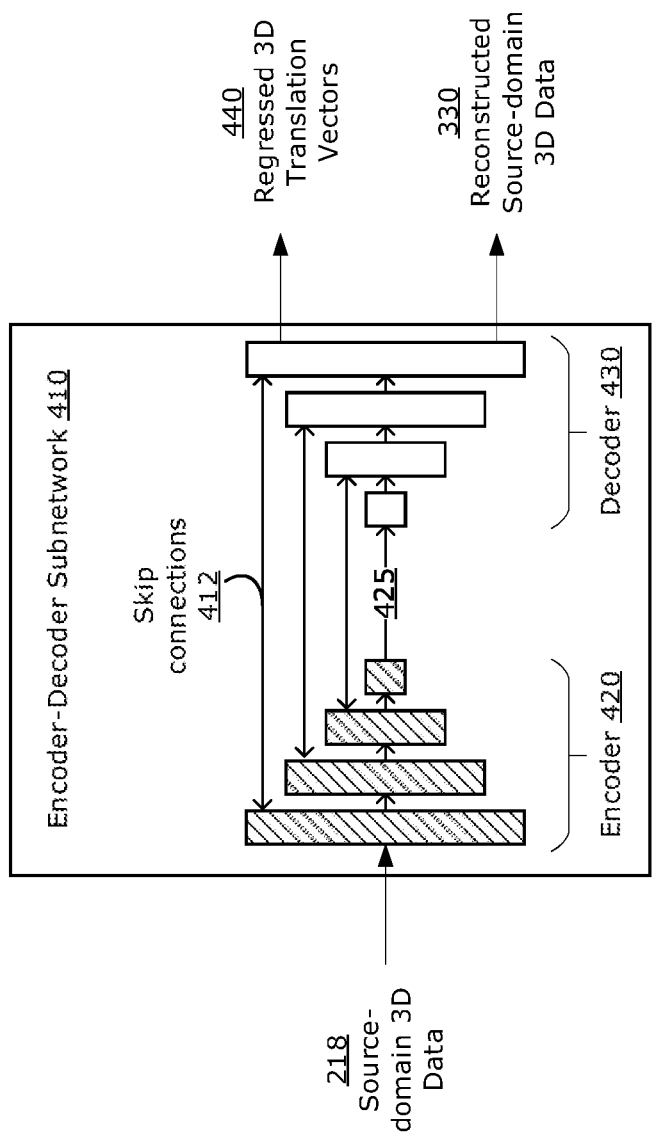
FIG. 4B illustrates an example architecture of an example encoder-decoder subnetwork, in accordance with examples described herein.

FIG. 4B illustrates an example architecture for the encoder-decoder subnetwork 410. In some examples, the architecture of the encoder 420 may include three KPConv layers. In some examples, at each layer the original number of points is preserved without applying any grid sampling or dropping any points between layers. In some examples, the 3D neighborhood for the KPConv convolutions is defined by a 3D sphere radius. In some examples, the size of the 3D sphere radius may be increased at each layer of the encoder 420 in order to increase the receptive field while preserving all points between layers. In some examples, the encoder 420 includes skip connections 412 at each layer to enable feature concatenations. In some examples, the encoded features 425 and skip connections 412 of the encoder 420 are not stored or transmitted for the purpose of compression, rather the encoded features 425 are passed immediately to the decoder.

In some examples, the decoder 430 may include multi-layer perceptron (MLP) layers. In some examples, the decoder 430 preserves the original number of input data points throughout the layers, and does not generate or introduce new 3D data points at each layer. In some examples, the decoder 430 receives the encoded features 425 to progressively regress 3D translation vectors 440, generating one translation vector per input point. In some examples, the decoder also outputs the reconstructed source-domain 3D data 330.

Returning to FIG. 4A, in some examples, the domain adaptation network 310 also includes a point cloud generator 450 that receives the set of N regressed 3D translation vectors δ 440 and the reconstructed source-domain 3D data ŷ 330 and outputs an interpolated 3D data x̃ 320. In some examples, the interpolated 3D data x̃ 320 is a 3D point cloud of N points that are arranged as horizontal LiDAR scans, with each point of the interpolated 3D data x̃ 320 being positioned with respect to a corresponding point of the reconstructed source-domain 3D data ŷ 330, for example, positioned in-between the 3D points of the reconstructed source-domain 3D data ŷ 330. In some examples, the point cloud generator 450 may generate the interpolated 3D data x̃ 320 as a locally-translated version of the reconstructed source-domain 3D data ŷ 330 by adding a corresponding regressed 3D translation vector δ 440 to each point in the reconstructed source-domain 3D data ŷ 330, as shown in equation 1.

$$\tilde{x} = \hat{y} + \delta \qquad (1)$$

Returning to FIG. 3, in some examples, a combiner 340 concatenates the interpolated 3D data x̃ 320 and the reconstructed source-domain 3D data ŷ 330 to obtain a densified source-domain 3D data 350.

Figure 5A:
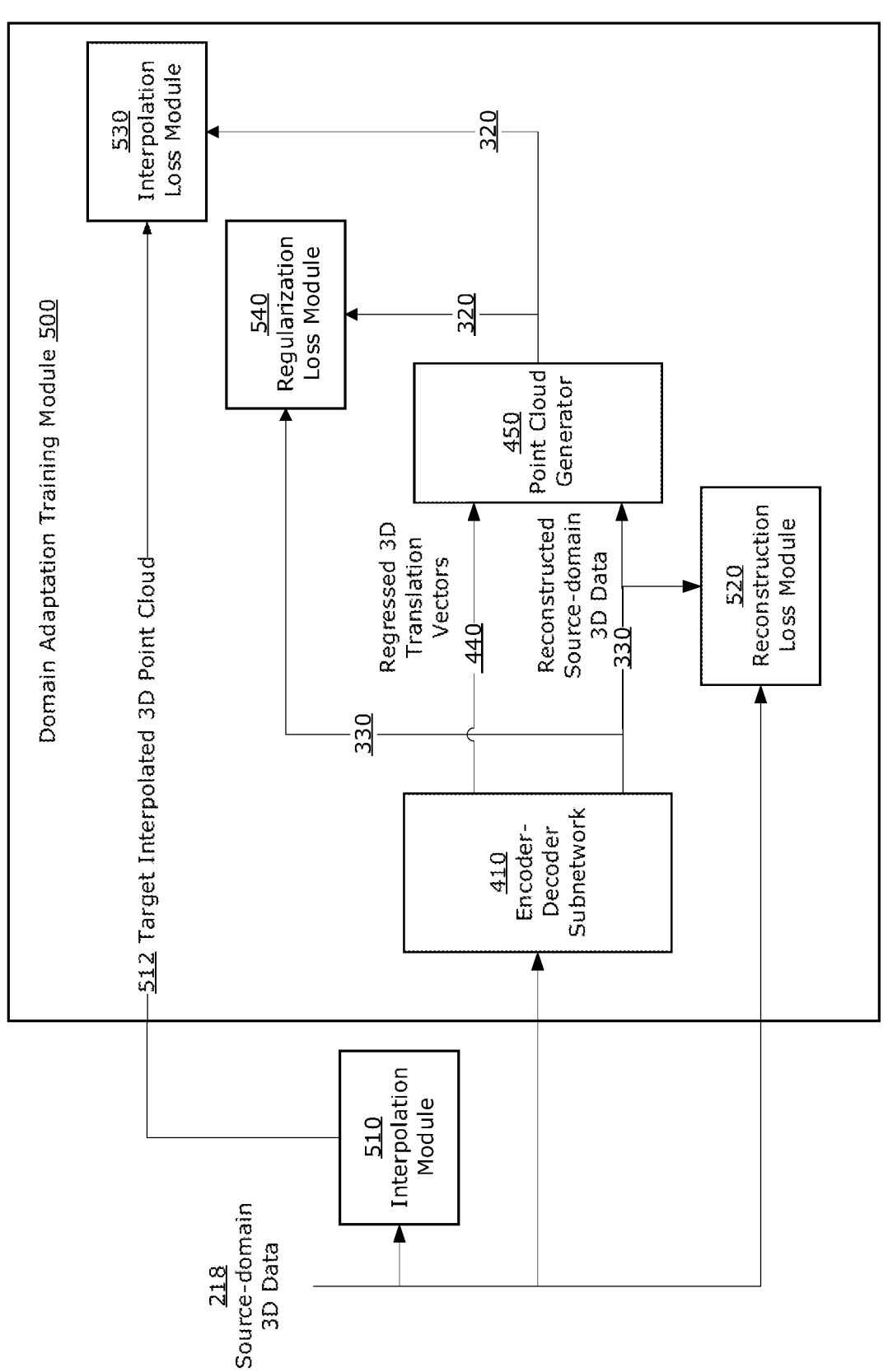
FIG. 5A is a block diagram illustrating some components of an example system for training a domain adaptation network, in accordance with examples described herein.

FIG. 5A illustrates the operation of an example domain adaptation training module 500 executed by the processor 202 of the system 200. In the illustrated embodiment, the domain adaptation training module 500 includes several functional components or submodules: an interpolation module 510, an encoder-decoder subnetwork 410, a point cloud generator 450, a reconstruction loss module 520, an interpolation loss module 530 and a regularization loss module 540. Some of these functional components or submodules may include further sub-components, or may make use of auxiliary sub-components. In some examples, the interpolation module 510 is an auxiliary module, and its purpose is to pre-generate (e.g. before training) a set of target training data to be used during the operation of the domain adaptation training module 500.

In some examples, the training data used to train the encoder-decoder subnetwork 410 may include a dataset containing ground-truth labels (e.g. targets). In some examples, the ground-truth labels are time-consuming and expensive to generate manually, therefore an automatic approach is beneficial. In some examples, the target data includes 3D data point locations representing LIDAR scan lines, where the LiDAR scan lines can also be upsampled from a sparse source-domain 3D data to simulate the availability of additional channels of a LIDAR sensor by defining locations for intermediate 3D data point locations in-between real LiDAR scan lines. In some examples, the source-domain 3D data 218 may provide part of the required dataset for training, while a modeled dataset representing intermediate 3D data point locations in-between the source-domain 3D data 218 point locations can provide the remaining training data.

In some examples, to create the required training data, the interpolation module 510 receives the source-domain 3D data 218 of N points and generates a target interpolated 3D point cloud 512 of M points, where M is different than N. In some examples, the interpolation module 510 is a Model-free geometry-based LiDAR densifier (MFGLD). In some examples, the interpolation module 510 is model-free because it is not trained like a neural network or other machine learning model. In some examples, the interpolation module 510 uses a 3D point neighborhood-based association mechanism to associate each input 3D data point from one channel to another 3D data point from a different channel. In some examples, the location of an interpolated 3D data point may be projected using a simple geometry projection. In some examples, the target interpolated 3D point cloud 512 may contain noise and distortions caused by the interpolation processes. For this reasons, the target interpolated 3D point cloud 512 may be considered as "weak labels".

FIG. 6 is a flowchart illustrating steps of an example method 600 for generating a target interpolated 3D point cloud 512 using a 3D point neighborhood-based association mechanism performed by the interpolation module 510, in accordance with examples of the present disclosure. The method 600 can be performed by the computing system 200. For example, the processor 202 can execute computer readable instructions (which can be stored in the memory 204) to cause the computing system 200 to perform the method 600.

The method 600 starts at step 602, in which a vertical angle $\gamma$ and a horizontal angle $\theta$ are computed for each point in the source-domain 3D data 218.

At step 604, a histogram of vertical angle bins is generated based on the vertical angle computed for each point in the source-domain 3D data.

At step 606, groups of points are clustered into curves C based on the vertical angle bin.

At step 608, for each pair of neighboring curves $C_1$ and $C_2$, a first point from the first curve $C_1$ is associated with a nearest-point from the second curve $C_2$ (e.g. a second point) using a 3D point neighborhood-based association mechanism. In some examples, a unit vector pointing towards the LiDAR sensor origin is generated and used to define a new unit vector lying on the vertical plane, where the new unit vector is defined by the vertical axis of the 3D coordinate system and the first point. In examples, the Z element of the new vector is set to the value of the Z-element of the second point. In some examples, a new intermediate point information (for example, an intermediate point location or any other available point information such as LiDAR response) is found as the projection of the vector between the first and second points (e.g. the two points being associated), and the new vector lying on the vertical plane, and normalizing the result. In some examples, the intermediate point information may be scaled by a selectable scaling factor, (for example, $\frac{1}{2}$, $\frac{1}{3}$, $\frac{1}{4}$ etc.) to define a new parameter of the interpolated 3D data point, for example, to define the new location of the interpolated 3D data point. It may be noted that, by selecting different scaling factors, different interpolated 3D data points may be defined based on the same source 3D data.

At step 610, step 608 is repeated for each data point in the source-domain 3D data 218 to assemble a target interpolated 3D point cloud 512.

At step 612, the assembled target interpolated 3D point cloud 512 is output by the interpolation module 510.

An example of a 3D point neighborhood-based association mechanism is described in: Corral-Soto, Eduardo R., and James H. Elder. "Automatic single-view calibration and rectification from parallel planar curves." European Conference on Computer Vision. Springer, Cham, 2014, the entirety of which is hereby incorporated by reference.

FIG. 7. illustrates an example pseudocode 700 corresponding to step 608 of FIG. 6. In examples, the pseudocode may be used for generating interpolated 3D points of the target interpolated 3D point cloud 512, using a 3D point neighborhood-based association mechanism, as described above with respect to FIG. 6.

Returning to FIG. 5A, the encoder-decoder subnetwork 410 of the domain adaptation network 310 receives the source-domain 3D data as input for training. In some examples, the encoder-decoder subnetwork 410 aims to learn to output a reconstructed source-domain 3D data y 330 that resembles the source-domain 3D data y 218. In some examples, a reconstruction loss module 520 is used to compute a chamfer loss $L_R$ between the two sets of data points CH $(y,\tilde{y})$ using equation 2.

$$L_R = \beta_1 CH(y,\hat{y}) \tag{2}$$

where $\beta_1$ is a scalar used to weight the contribution of CH.

In some examples, the encoder-decoder subnetwork 410 also aims to learn to output a set of regressed 3D translation vectors $\delta$ 440 that are used by the point cloud generator 450 to generate the interpolated 3D data x 320, according to equation 1. In some examples, an interpolation loss module 530 is used to compute a chamfer loss $L_1$ between the target interpolated 3D point cloud 512 and module and the interpolated 3D data $\tilde{x}$ 320 CH $(x,\tilde{x})$, using equation 3.

$$L_1 = \beta_2 CH(x,\tilde{x}) \tag{3}$$

where $\beta_2$ is a scalar used to weight the contribution of CH.

In some examples, training the domain adaptation network 310 using only the two Chamfer losses (e.g. the reconstruction loss $E_R$ and the interpolation loss $L_1$) described above produces estimated 3D points that do not lie along a feasible intermediate LiDAR channel location (e.g. their 3D locations are unconstrained). In some examples, to address this problem and to encourage the estimated interpolated 3D data points to fall within a valid physically-feasible LiDAR channel location, a regularization module 540 is used to apply a LIDAR channel alignment loss called a regulation loss $l_{Reg}$. In some examples, the regularization module 540 computes a LIDAR channel alignment loss using a vertical angle $\gamma$ and a horizontal angle $\theta$ based on the sine function.

Figure 5B:
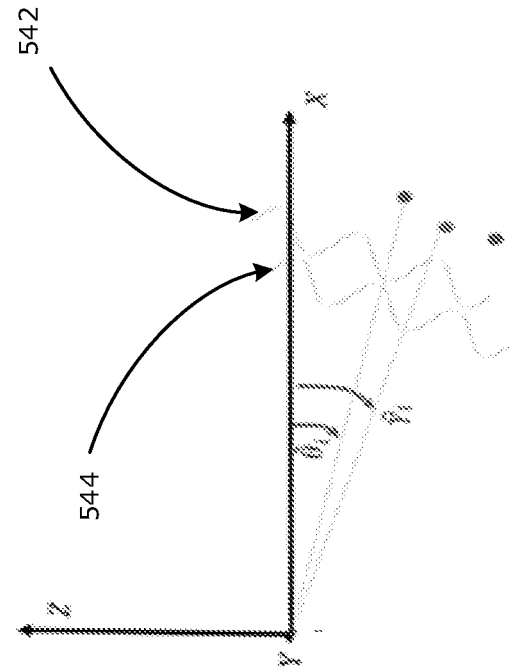
FIG. 5B illustrates an example application of sine functions to compute a regularization loss, in accordance with examples described herein.

FIG. 5B illustrates an example application of sine functions to compute a regularization loss $L_{Reg}$. In some examples, the purpose of the regularization loss is to encourage each point in the reconstructed source-domain 3D data $\tilde{y}$ 330 and the interpolated 3D data x 320 to: group into subsets corresponding to channels of 3D data points that fall near a feasible LiDAR channel location, by minimizing their angle with respect to the valley of a sine wave function, and group into "even" and "odd" LiDAR channels by encouraging the points in the interpolated 3D data x 320 to fall at an intermediate vertical angle location away from the points in the reconstructed source-domain 3D data y 330. In some examples, this is achieved using two sine loss functions, described by equation 4 (shown as sine function 542 in FIG. 5B) and equation 5 (shown as sine function 544 in FIG. 5B), where equation 5 has been shifted by pi.

$$-\frac{1}{2}\sum_{i=0}^{N}\left(1 + \sin\left(2\pi\frac{\gamma_i}{\theta_s}\right)\right) \tag{4}$$

$$-\frac{1}{2}\sum_{i=0}^{N}\left(1 + \sin\left(2\pi\frac{\theta_i}{\theta_s} - \pi\right)\right) \tag{5}$$

where $\theta s$ is a measure of the vertical angle resolution of the LiDAR sensor from two adjacent LiDAR rays from the source-domain 3D data 218, $\gamma_i$ is the vertical angle for each point in the reconstructed source-domain 3D data $\tilde{y}$ 330 and $\theta_i$ is the vertical angle for each point in the interpolated 3D data $\tilde{x}$ 320.

In some examples, the purpose of the regularization loss is encourage each point in the reconstructed source-domain 3D data y 330 and the interpolated 3D data $\tilde{x}$ 320 to: group into subsets corresponding to channels of 3D data points that fall near a feasible LiDAR channel location, by minimizing their angle with respect to the valley of a sine wave function, and group points into "even" and "odd" LiDAR channels by encouraging the points in the interpolated 3D data x 320 to fall at an intermediate vertical angle location away from the points in the reconstructed source-domain 3D data $\tilde{y}$.

In some examples, the vertical angle LiDAR channel alignment loss and the horizontal angle LiDAR channel alignment loss are combined to form a regularization loss $L_{Reg}$, using equation 6.

$$\mathcal{L}_{Reg} = \beta_3 \left[ -\frac{1}{2} \sum_{i=0}^{N} \left( 1 + \sin\left(2\pi \frac{\gamma_i}{\theta_s}\right) \right) - \frac{1}{2} \sum_{i=0}^{N} \left( 1 + \sin\left(2\pi \frac{\theta_i}{\theta_s} - \pi\right) \right) \right] \quad (6)$$

Thus, training the domain adaptation network 310 may involve computing an overall loss function L that is composed of the reconstruction loss $L_R$, interpolation loss $L_1$ and regularization loss $L_{Reg}$, according to equation 7.

$$L = L_R + L_1 + L_{Reg} \quad (7)$$

Figure 8A:
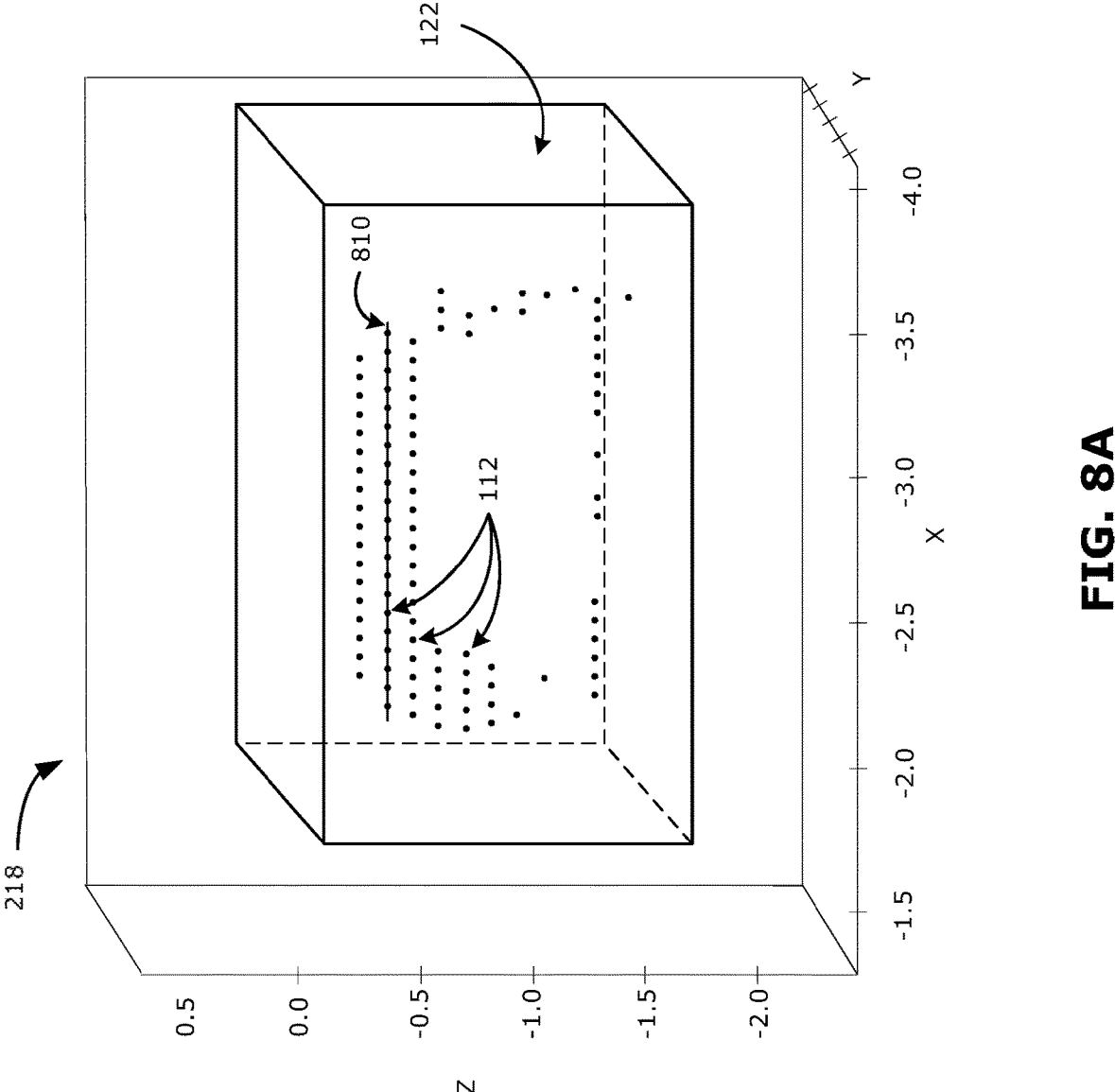
FIG. 8A is a front perspective view of an example 3D point cloud input frame, in accordance with examples described herein.

FIG. 8A is a detailed front perspective view of an example source-domain 3D data 218, in accordance with examples described herein. In some embodiments, for example, the source-domain 3D data 218 may be a cluster of points 112 (for example, a cluster of points for a "car" point cloud object instance from FIG. 1) enclosed by a bounding box 122 within a point cloud frame 100 generated by a LIDAR sensor (or other 3D sensor, as described above). In examples, the cluster of points 112 may be arranged along scan lines 810. It is understood that the source-domain 3D data 218 may include any number of clusters of points within the point cloud frame 100 and is not limited to clusters of points corresponding to a single object instance (e.g. "car").

Figure 8B:
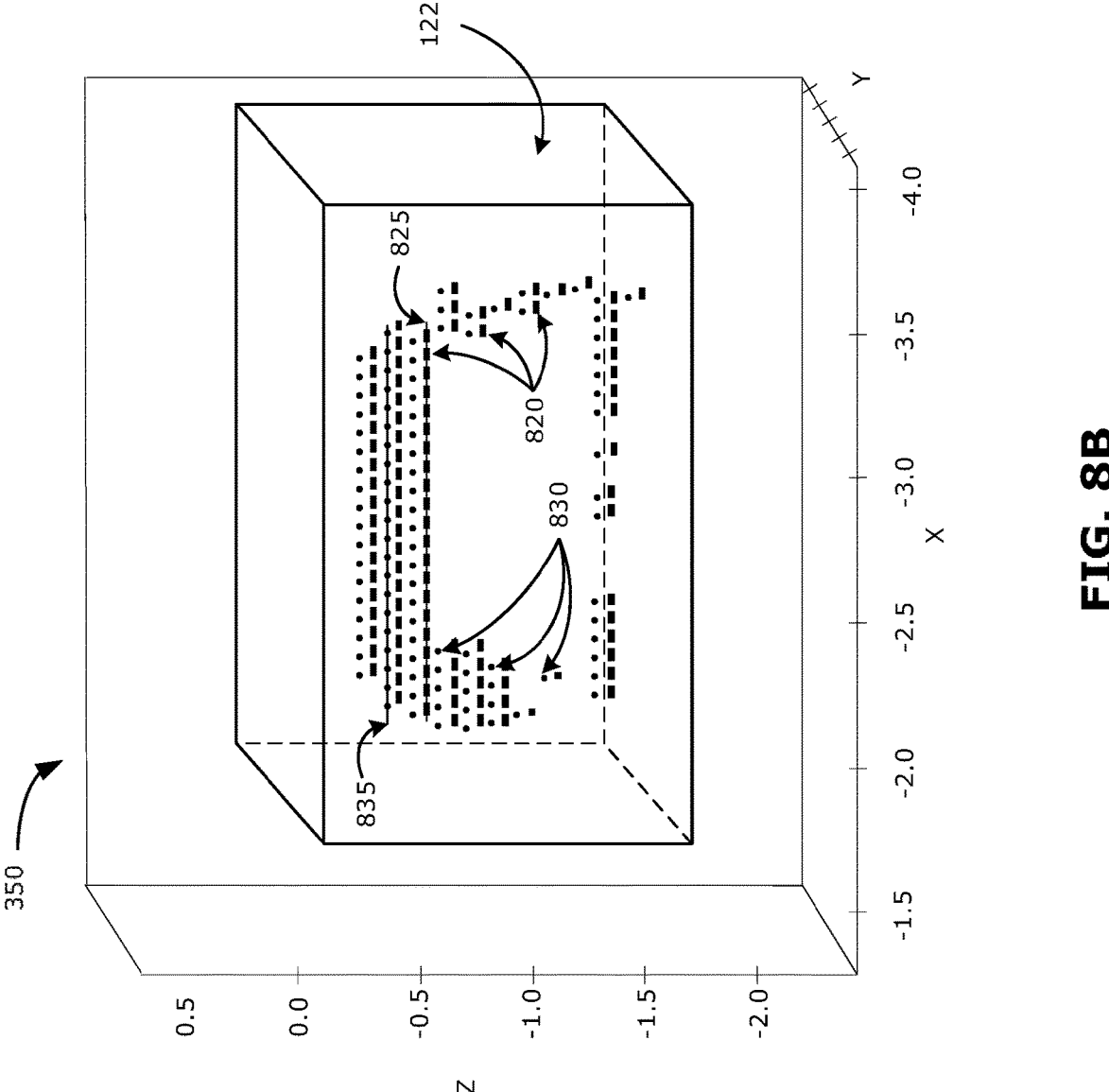
FIG. 8B is a front perspective view of the example 3D point cloud input frame of FIG. 8A that has been densified to form a densified 3D point cloud input frame, in accordance with examples described herein.

FIG. 8B is a front perspective view of an example densified source-domain 3D data 350, where the dense 3D point cloud is a densified version of the source-domain 3D data 218 of FIG. 8A, in accordance with examples described herein. In examples, a densified source-domain 3D data 350 may include clusters of points 830 corresponding to reconstructed source-domain 3D data 330, depicted by circular markers and arranged along scan lines 835. In examples, the densified source-domain 3D data 350 may also include clusters of points 820 corresponding to interpolated source-domain 3D data 320 depicted by circular markers and arranged along scan lines 825. In examples, the densified source-domain 3D data 350 may be enclosed by bounding box 122.

FIG. 9 is a flowchart illustrating steps of an example method 900 for domain adaptation using point cloud densification, in accordance with examples of the present disclosure. The method 900 can be performed by the computing system 200. For example, the processor 202 can execute computer readable instructions (which can be stored in the memory 204) to cause the computing system 200 to perform the method 900.

Method 900 begins at step 902, where a set of source-domain 3D data 218 is received in the form of a sparse 3D point cloud.

At step 904, the set of source-domain 3D data 218 is encoded using a trained domain adaptation network 310 to generate encoded source-domain 3D data in the form of encoded features 425.

At step 906, the encoded source-domain 3D data, in the form of encoded features 425, is decoded using the trained domain adaptation network 310 to generate one or more regressed 3D translation vectors 440.

At step 908, the encoded source-domain 3D data, in the form of encoded features 425, is also decoded using the trained domain adaptation network 310 to generate a set of reconstructed 3D data 330 in the form of a reconstructed sparse 3D point cloud.

At step 910, a set of interpolated 3D data 320 is computed based on the one or more regressed 3D translation vectors 440 and the set of reconstructed 3D data 330.

At step 912, the set of interpolated 3D data 320 and the set of source-domain 3D data 218 is concatenated to obtain a set of densified source-domain 3D data 350 in the form of a densified 3D point cloud.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
receiving a source-domain 3D point cloud comprising a set of source-domain 3D data;
encoding, using a trained domain adaptation network, the set of source-domain 3D data to generate encoded source-domain 3D data;
decoding, using the trained domain adaptation network, the encoded source-domain 3D data to generate one or more 3D translation vectors;
decoding, using the trained domain adaptation network, the encoded source-domain 3D data to generate a reconstructed 3D point cloud comprising a set of reconstructed 3D data;

computing a set of interpolated 3D data based on the one or more 3D translation vectors and the set of reconstructed 3D data; and concatenating the set of interpolated 3D data and the set of source-domain 3D data to obtain a densified 3D point cloud comprising a set of densified 3D data.

2. The method of claim 1, wherein encoding the set of source-domain 3D data to generate encoded source-domain 3D data comprises:

performing kernel point convolution on each point in the set of source-domain 3D data to generate one or more feature arrays.

3. The method of claim 2, wherein decoding the encoded source-domain 3D data to generate one or more 3D translation vectors comprises:

performing a regression on the encoded source-domain 3D data to generate a 3D translation vector corresponding to each point in the set of reconstructed 3D data.

4. The method of claim 3, wherein computing the set of interpolated 3D data comprises:

adding a corresponding translation vector to each corresponding data point in the set of reconstructed 3D data to obtain a locally-translated version of the reconstructed 3D data points.

5. The method of claim 1, further comprising training the domain adaptation network by:

obtaining a first training data, based on the set of source-domain 3D data;

computing a second training data comprising a set of target interpolated 3D data, based on the set of source-domain 3D data; and training the domain adaptation network based on the first training data and the second training data, where training of the domain adaptation network includes computing an overall loss function.

6. The method of claim 5, wherein computing the second training data comprises:

for each point in the set of source-domain 3D data:

computing a vertical angle and a horizontal angle;

generating a histogram of vertical angle bins based on the vertical angle computed for each point in the set of source-domain 3D data;

clustering groups of points of the set of source-domain 3D data into curves based on the histogram of vertical angle bins;

associating a first point corresponding to a first group of clustered points with a nearest-point from a second group of clustered points, using a 3D point neighborhood-based association mechanism;

generating a unit vector corresponding to the first point corresponding to a first group of clustered points based on the nearest-point from the second group of clustered points;

projecting an intermediate point information based on unit vector corresponding to the first point corresponding to the first group of clustered points; and scaling the intermediate point information based on a scaling factor to define an interpolated point.

7. The method of claim 6, wherein the projected intermediate point information is a location and the scaled intermediate point location defines an interpolated position of the point.

8. The method of claim 6, wherein the scaling factor is selectable and different interpolated points are definable for the first point by scaling the intermediate point information based on different selections of the scaling factor.

9. The method of claim 5, where computing the overall loss function comprises calculating at least one of:

a reconstruction loss;

an interpolation loss; or a regularization loss.

10. The method of claim 9, wherein calculating the regularization loss comprises:

calculating one or more vertical angles for each point in the reconstructed 3D data;

calculating one or more vertical angles for each point in the target interpolated 3D data;

computing one or more sine loss functions based on the one or more vertical angles for each point in the reconstructed 3D data and the one or more vertical angles for each point in the target interpolated 3D data; and comparing the one or more vertical angles for each point in the reconstructed 3D data and the one or more vertical angles for each point in the target interpolated 3D data to a corresponding sine function of the one or more sine loss functions and minimizing the one or more vertical angles with respect to a valley of the corresponding sine function.

11. The method of claim 1, wherein the set of source-domain 3D data is received from a LIDAR sensor, the LiDAR sensor being a rotating LiDAR sensor.

12. A system comprising:

one or more processors;

one or more memories storing machine-executable instructions, which, when executed by the one or more processors, cause the system to:

receive a source-domain 3D point cloud comprising a set of source-domain 3D data;

encode, using a trained domain adaptation network, the set of source-domain 3D data to generate encoded source-domain 3D data;

decode, using the trained domain adaptation network, the encoded source-domain 3D data to generate one or more 3D translation vectors;

decode, using the trained domain adaptation network, the encoded source-domain 3D data to generate a reconstructed 3D point cloud comprising a set of reconstructed 3D data;

compute a set of interpolated 3D data based on the one or more 3D translation vectors and the set of reconstructed 3D data; and concatenate the set of interpolated 3D data and the set of source-domain 3D data to obtain a densified 3D point cloud comprising a set of densified 3D data.

13. The system of claim 12, wherein the machine-executable instructions, when executed by the one or more processors to encode the set of source-domain 3D data to generate encoded source-domain 3D data, further cause the system to:

perform kernel point convolution on each point in the set of source-domain 3D data to generate one or more feature arrays.

14. The system of claim 13, wherein the machine-executable instructions, when executed by the one or more processors to decode the set of source-domain 3D data to generate one or more 3D translation vectors, further cause the system to:

perform a regression on the encoded source-domain 3D data to generate a 3D translation vector corresponding to each point in the set of reconstructed 3D data.

15. The system of claim 14, wherein the machine-executable instructions, when executed by the one or more processors to compute the set of interpolated 3D data, further cause the system to:

add a corresponding translation vector to each corresponding data point in the set of reconstructed 3D data to obtain a locally-translated version of the reconstructed 3D data points.

16. The system of claim 12, wherein the machine-executable instructions, when executed by the one or more processors, further cause the system to:

train the domain adaptation network by:

obtaining a first training data, based on the set of source-domain 3D data;

computing a second training data comprising a set of target interpolated 3D data, based on the set of source-domain 3D data; and training the domain adaptation network based on the first training data and the second training data, where training of the domain adaptation network includes computing an overall loss function.

17. The system of claim 16, wherein the machine-executable instructions, when executed by the one or more processors to compute a second training data, further cause the system to:

for each point in the set of source-domain 3D data:

compute a vertical angle and a horizontal angle;

generate a histogram of vertical angle bins based on the vertical angle computed for each point in the set of source-domain 3D data;

cluster groups of points of the set of source-domain 3D data into curves based on the histogram of vertical angle bins;

associate a first point corresponding to a first group of clustered points with a nearest-point from a second group of clustered points, using a 3D point neighborhood-based association mechanism;

generate a unit vector corresponding to the first point corresponding to a first group of clustered points based on the nearest-point from the second group of clustered points;

project an intermediate point information based on unit vector corresponding to the first point corresponding to the first group of clustered points; and scale the intermediate point information based on a scaling factor to define an interpolated point.

18. The system of claim 17, wherein the projected intermediate point information is a location and the scaled intermediate point location defines an interpolated position of the point.

19. The system of claim 16, wherein the machine-executable instructions, when executed by the one or more processors to compute an overall loss function, further cause the system to:

calculate a regularization loss by:

calculating one or more vertical angles for each point in the reconstructed 3D data;

calculating one or more vertical angles for each point in the target interpolated 3D data;

computing one or more sine loss functions based on the one or more vertical angles for each point in the reconstructed 3D data and the one or more vertical angles for each point in the target interpolated 3D data; and comparing the one or more vertical angles for each point in the reconstructed 3D data and the one or more vertical angles for each point in the target interpolated 3D data to a corresponding sine function of the one or more sine loss functions and minimizing the one or more vertical angles with respect to a valley of the corresponding sine function.

20. A non-transitory computer-readable medium having machine-executable instructions stored thereon which, when executed by one or more processors of a computing system, cause the computing system to:

receive a source-domain 3D point cloud comprising a set of source-domain 3D data;

encode, using a trained domain adaptation network, the set of source-domain 3D data to generate encoded source-domain 3D data;

decode, using the trained domain adaptation network, the encoded source-domain 3D data to generate one or more 3D translation vectors;

decode, using the trained domain adaptation network, the encoded source-domain 3D data to generate a reconstructed 3D point cloud comprising a set of reconstructed 3D data;

compute a set of interpolated 3D data based on the one or more 3D translation vectors and the set of reconstructed 3D data; and concatenate the set of interpolated 3D data and the set of source-domain 3D data to obtain a densified 3D point cloud comprising a set of densified 3D data.

* * * * *